Dec. 27, 1966  H. L. SAUMS ETAL  3,294,731
PYROLIZABLE ENAMEL FROM Mn AND Co CHELATES, GLASS, AND
SILOXANE RESIN
Filed March 8, 1962
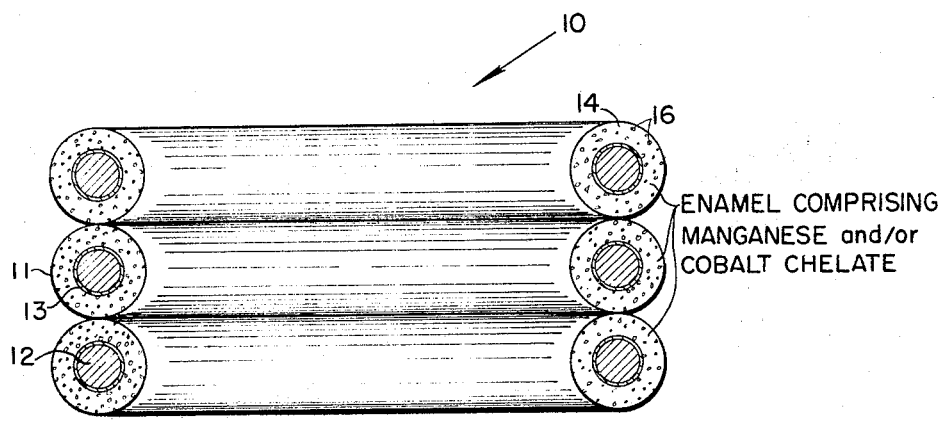
INVENTORS
HARRY L. SAUMS
WESLEY W. PENDLETON
BY
V. F. Volk
their agent

United States Patent Office 3,294,731
Patented Dec. 27, 1966

3,294,731
PYROLIZABLE ENAMEL FROM Mn AND Co CHELATES, GLASS, AND SILOXANE RESIN
Harry L. Saums, North Muskegon, and Wesley W. Pendleton, Muskegon, Mich., assignors, by mesne assignments, to Anaconda Wire and Cable Company, a corporation of Delaware
Filed Mar. 8, 1962, Ser. No. 178,349
2 Claims. (Cl. 260—37)

This application is a continuation-in-part of our application Serial No. 173,115, filed February 14, 1962.

Our invention relates to an improvement in metal coating enamels of the type comprising fusible glass elements where it is intended to pyrolize the organic constituent and fuse the glass to form the final coating. Particularly, our invention relates to the inclusion in said enamels of manganese and cobalt chelates.

In the preparation of electrical windings for very high temperature service it has been disclosed by the present applicants in the above-referenced application now pending to coat magnet wire with a fusible glass held in place by an organic enamel, to form the coated wire into windings, to burn or pyrolize off the organic constituent and to fuse the glass so that the insulating components of the completed winding are entirely vitreous and free from carbon compounds with the result that the winding can be safely operated at temperatures in excess of 500° C. which would completely destroy conventional windings.

Selection of a suitable organic varnish or enamel to bond the fibrous inorganic dielectric to the magnet wire may be made from any varnish which is capable of bonding the inorganic fiber to the metallic conductor and of bonding the individual fibers to each other and of holding the finely-divided glasses in suspension, since the primary function of the varnish is to protect the inorganic fiber from cracking or breaking while the coated conductor is being formed into a winding. In addition, the pyrolysis point of the particular varnish used (the pyrolysis point being that temperature at which all of the organic matter in the varnish becomes fugitive or is pyrolytically volatilized), must be appreciably below the fusion point or temperature of the particular organic fiber used to form the abrasion-resistant insulation about the magnet wire. Particularly satisfactory results have been obtained by using varnishes prepared from polyethylene terephthalate or other polyesters, from cellulose acetate or butyrate or from other cellulosic material, from epoxy resins and from phenolic resins, all of which are completely fugitive at their pyrolysis points.

Partially fugitive organic varnishes, which contain an inorganic moiety, may also be used to bond the fibrous inorganic dielectric to the conductor and thereby form a flexible, abrasion-resistant insulation about the magnet wire. Upon heating these varnishes to their pyrolysis point, only the organic matter volatilizes, leaving an inorganic residue which forms a matrix with the inorganic fiber. In particular, partially fugitive organic varnishes which contain silicon, such as those prepared from polysiloxanes, polysilanes, or polysilcarbanes, have been found satisfactory. Other varnishes, prepared from organogermanium, organotitanium, or organozirconium polymers, or from coordination polymers containing these materials, may be used to bond the inorganic fiber in place to form a flexible, abrasion-resistant insulation in any of the ways discussed. Since the heat of decomposition of carbon-carbon bonds is generally much lower than the heat of fusion of the lowest melting inorganic dielectric, all of these varnishes, including those which are completely or even partially fugitive at their pyrolysis points, may be pyrolytically volatilized from the abrasion-resistant insulation without reaching the fusion point of the inorganic fiber.

In the course of manufacturing windings of the type described above there is a critical period, during and directly following the pyrolysis of the organic enamel and prior to the complete fusion of the glass where the latter may become separated from the wire it is intended to cover. This wire is usually a nickel-plated copper wire and in prior art methods there is no adhesion of glass to the nickel surface after the organic binder has been pyrolized.

It is an object of our invention to maintain the integrity of the glass insulation of an electrical winding during and subsequent to the fusion of the glass into a contiguous coating.

We have found that when a small percentage of a cobalt or manganese chelate is added to the enamel composition the glass remains in position on the wire and we have invented an electrical system comprising a conductor, fusible glass insulation surrounding the conductor, and an organic binder supporting the insulation. Our binder is intended to be pyrolized prior to the fusion of the glass insulation and it comprises a minor amount of cobalt or manganese chelate. Our insulation may comprise glass particles suspended in enamel and the amount of chelate will preferably comprise 0.5–3% by weight. We prefer to use cobaltous or manganous ethylenediamine tetraacetate.

We have invented a magnet wire enamel comprising 10–25 parts by weight of fusible powdered glass, 75–90 parts by weight of organic enamel such as terephthalate modified phenyl-methyl-siloxane resin, and 0.5–3 parts by weight of manganous or cobaltous chelate.

*Example*

In an example a magnet wire enamel was formulated as follows:

2.8 lbs. finely powdered aluminum borosilicate glass, 0.14 lb. cobaltous ethylenediamine tetraacetate, 0.14 lb. manganous ethylenediamine tetraacetate, and 14.0 lbs. terephthalate polyester modified phenyl-methyl-siloxane (50% solids, in xylene).

The slurry of the example was applied to a nickel-plated copper wire and baked at 250° C. to form a uniform coating. The wire was then wound into a coil and placed in an oven at 500° C. for 15 minutes to burn off the enamel. Thereafter the oven temperature was raised to 650° C. for ½ an hour to fuse the insulation. When it was subsequently cooled the coil wire forming the coil was found to be insulated with a uniform coating of fused glass.

Features of our invention are shown in the appended drawing.

The drawing shows a section of a coil made to our invention prior to pyrolizing the enamel.

In the drawing a coil is indicated generally by the numeral 10 made up of a plurality of turns of a magnet wire 11. The wire 11 has a copper conductor 12 with an outer plating 13 of nickel to prevent oxidation of the copper at high temperatures of operation. The nickel coating is much exaggerated in the drawing and it will be understood that we do not wish to limit our invention to any particular selection of conductor material. Surrounding the conductor 12 is an organic enamel 14 in which has been suspended and baked prior to the formation of the coil 10 a sufficient percentage of glass particles 16 to completely coat the conductor 12 after the enamel 14 has been pyrolized and the glass has been fused. It is a feature of the enamel 14 that it comprises a small percentage of manganese and cobalt chelate.

The electrical system comprising the wire 12 and glass-comprising enamel 14 may be shipped and stored for long periods prior to forming into windings.

We have invented new and useful articles and compositions for which we desire an award of Letters Patent.

We claim:

1. A magnet wire enamel comprising 10–25 parts by weight of fusible powdered glass, 75–90 parts by weight of terephthalate modified phenyl-methyl-siloxane resin enamel, 0.5–3 parts by weight of metal chelate selected from the group consisting of manganous and cobalt chelates.

2. A magnet wire enamel comprising 10–25 parts by weight of fusible powdered glass, 75–90 parts by weight of terephthalate modified phenyl-methyl-siloxane resin and 0.5–3 parts by weight of metal chelate selected from the group consisting of cobaltous ethylenediamine tetraacetate and manganous ethylenediamine tetraacetate.

References Cited by the Examiner

UNITED STATES PATENTS

| | | | |
|---|---|---|---|
| 2,047,029 | 7/1936 | Mueller | 117—231 |
| 2,059,280 | 11/1936 | Rubin | 117—231 |
| 2,465,296 | 3/1949 | Swiss. | |
| 2,991,266 | 7/1961 | Bluestein et al. | 260—37 |
| 3,026,282 | 3/1962 | Pike | 260—37 |
| 3,075,941 | 1/1963 | Wynstra et al. | 260—37 XR |
| 3,093,511 | 6/1963 | Weisel et al. | 106—291 XR |
| 3,114,840 | 12/1963 | Johnston. | |

MORRIS LIEBMAN, *Primary Examiner.*

MILTON STERMAN, *Examiner.*

A. H. KOECKERT, *Assistant Examiner.*